United States Patent [19]

Kratel et al.

[11] 4,212,925

[45] Jul. 15, 1980

[54] HEAT INSULATING ARTICLES

[75] Inventors: Günter Kratel; Günter Stohr, both of Durach; Hans Katzer, Munich, all of Fed. Rep. of Germany

[73] Assignee: Wacker-Chemie GmbH, Munich, Fed. Rep. of Germany

[21] Appl. No.: 965,721

[22] Filed: Dec. 1, 1978

[30] Foreign Application Priority Data

Dec. 7, 1977 [DE] Fed. Rep. of Germany ....... 2754517

[51] Int. Cl.² .............................. B32 9/04; B05D 3/02
[52] U.S. Cl. .................. 428/447; 106/287.11; 106/287.12; 106/287.14; 106/287.16; 174/137 A; 252/62; 427/255; 427/314; 427/387; 427/421; 427/428; 427/430; 428/920
[58] Field of Search .............. 427/387, 255, 314, 421, 427/428, 430 R; 428/920, 538, 447, 446; 252/62; 106/287.11, 287.12, 287.14, 287.16; 174/137 A

[56] References Cited

U.S. PATENT DOCUMENTS

| | | | |
|---|---|---|---|
| 3,296,153 | 1/1967 | Snogren | 252/62 X |
| 3,318,844 | 5/1967 | Krantz | 252/62 X |
| 3,944,702 | 3/1976 | Clark | 428/920 X |
| 4,112,179 | 9/1978 | Maccalous et al. | 428/920 X |

FOREIGN PATENT DOCUMENTS 2036124  3/1973  Fed. Rep. of Germany .
1302462  1/1972  United Kingdom ................ 428/920 X

*Primary Examiner*—Shrive P. Beck
*Assistant Examiner*—Thurman K. Page

[57] ABSTRACT

This invention relates to a process for improving heat insulating articles containing silicon dioxide having a surface area of at least 50 m²/g, opacifiers and, if desired, inorganic fibers which comprises treating the surface of the insulating articles with at least one organosilicon compound containing from 1 to 4 silicon atoms to render the same hydrophobic.

5 Claims, No Drawings

HEAT INSULATING ARTICLES

The present invention relates to heat insulating articles and more particularly to a process for treating heat insulating articles to render the same hydrophobic.

BACKGROUND OF INVENTION

Heat insulating articles which are prepared via a dry process and which consist of silicon dioxide having a surface area of at least 50 m²/g, opacifiers and optionally, inorganic fibers are described in German Pat. No. 2,036,124.

Heretofore, heat insulating articles prepared from silicon dioxide had a tendency to deteriorate when exposed to water. However, if heat insulating articles are prepared from inorganic fibers, opacifiers and silicon dioxide having a surface area of at least 50 m²/g which has been treated with for example trimethylethoxysilane to render the same partially or wholly hydrophobic, the resultant heat insulating articles have poor mechanical strength. Moreover, if one were to prepare waterrepellent heat insulating articles via a dry process using inorganic fibers, opacifiers and silicon dioxide having a surface area of at least 50 m²/g which has been treated with, for example trimethylethoxysilane to render the same partially hydrophobic, the resultant heat insulating articles are somewhat water repellent, but lack mechanical strength. Likewise when a mixture containing untreated silicon dioxide and more or less completely hydrophobic silicon dioxide having a surface area of at least 50 m²/g is used in the preparation of heat insulating articles, these articles have very little mechanical strength. Thus, it would be desirable to have heat insulating articles with good mechanical strength which will not deteriorate when exposed to water.

Therefore, it is an object of this invention to provide heat insulating articles which are hydrophobic and have good mechanical strength. Another object of this invention is to provide heat insulating articles which will not deteriorate when exposed to water. Still another object of this invention is to provide a process for treating heat insulating articles to improve their properties. A further object of this invention is to provide a process for treating heat insulating articles to render them hydrophobic.

SUMMARY OF INVENTION

The foregoing objects and others which will become apparent from the following description are accomplished in accordance with this invention, generally speaking, by providing a process for improving heat insulating articles prepared by the dry process containing silicon dioxide having a surface area of at least 50 m²/g, opacifiers and optionally, inorganic fibers which comprises treating the surface of the heat insulating article with at least one organosilicon compound containing from 1 to 4 silicon atoms and thereafter removing the excess organosilicon compound from the treated article.

DETAILED DESCRIPTION OF INVENTION

By heat insulating articles we mean to include heat protecting elements as well as heat insulators. These articles may be in the shape of plates or some other configuration. The plates may have a porous sheath, for example a sheath made of a fiberglass fabric or a fiberglass fleece. Additional examples of such porous sheaths are the cotton fabrics, papers and perforated polyethylene foils described in German Pat. No. 2,036,124. However it is not essential that the plates be covered.

It is preferred that an untreated, i.e., a hydrophobic silicon dioxide having a surface area of at least 50 m²/g be used in the preparation of the heat insulating articles. The surface area of the silicon dioxide is determined by the "BET Method", i.e., by means of nitrogen absorption in accordance with ASTM Special Technical Bulletin No. 51, 1941, page 95. Pyrogenically produced silicon dioxide is the preferred silicon dioxide having a surface area of at least 50 m²/g. If desired, it is equally possible to employ silicic acid hydrogel which has been dehydrated while preserving its structure, as well as other precipitated silicon dioxide having a surface area of at least 50 m²/g.

Examples of opacifiers which may be employed are silicon carbide, titanium dioxide and Ilmenite. Opacifiers are preferably employed in an amount of from 30 to 75 percent by weight, based on the weight of the silicon dioxide having a surface area of at least 50 m²/g.

Examples of inorganic fibers are glass wool, rock wool, slag wool and ceramic fibers such as those which are obtained by melting aluminum oxide and silicon dioxide.

The heat insulating articles are formed by shaping the mixture of materials while under pressure.

The heat insulating articles which are treated in accordance with this invention are available, for example from Grunzweig & Hartmann AG, Ludwigshafen (German Federal Republic) and Micropore Insulation Ltd., Kidderminster, Worcester (Great Britain).

Examples of organosilicon compounds which may be used in the process of this invention are those corresponding to the general formula:

$$(R_3Si)_aZ \text{ or } R_aSiZ'_{4-a},$$

where R represents the same or different substituted and unsubstituted hydrocarbon radicals, Z and Z' represent halogen, hydrogen or a radical of the formula —OH, —OR', —NR'X, —ONR'$_2$, —SR' and —OOCR'. In the above formula Z may also represent —O—, —NX— or —S—; R' is a substituted or unsubstituted hydrocarbon radical, preferably an alkyl radical having from 1 to 4 carbon atoms; X is hydrogen or the same as R' and a is 1 or 2. Organosilicon compounds which are not included in the above general formulas but may be employed are hexamethylcyclotrisiloxane and octamethylcyclotetrasiloxane. The preferred hydrocarbon radical represented by R is the methyl radical. Other examples of hydrocarbon radicals represented by R are the ethyl, n-propyl, isopropyl, vinyl and phenyl radical.

Examples of substituted hydrocarbon radicals represented by R are preferably halogenated hydrocarbon radicals, for example the 3,3,3-trifluoropropyl radical.

Examples of hydrocarbon radicals represented by R' are the methyl and ethyl radicals. Additional examples of hydrocarbon radicals represented by R' are illustrated in the individual examples of organosilicon compounds which impart hydrophobic properties thereto.

An example of a substituted hydrocarbon radical represented by R', is the aminoethyl radical.

Examples of organosilicon compounds which may be employed are hexamethyldisilazane, trimethylethoxysilane, trimethylsilane, trimethylchlorosilane, trimethylsilylmercaptan, vinyldimethylacetoxysilane, trimethylsilylisopropylamine, trimethylsilylethylamine, dimethylphenylsilyl-n-propylamine, vinyldimethylsilyl-n-butylamine, diethylaminoxytrimethylsilane, diethylaminoxydimethylphenylsilane, hexamethyldisiloxane, 1,3-di-vinyl-1,1,3,3-tetramethyldisiloxane, 1,3-diphenyl-1,1,3,3-tetramethyldisiloxane, 1,3-diphenyl,1,1,3,3-tetramethyldisilazane, dimethyldichlorosilane, dimethyldiethoxysilane, dimethyldimethoxysilane, diphenyldiethoxysilane, vinylmethyldimethoxysilane, methyltriethoxysilane, hexamethylcyclotrisiloxane and octamethylcyclotetrasiloxane.

Hexamethylcyclotrisiloxane, octamethylcyclotetrasiloxane and hexamethyldisilazane are the preferred organosilicon compounds which are used in the process of this invention. The organosilicon compounds may of course be used alone or as mixtures in the process of this invention. For example it is possible to use a mixture containing hexamethylcyclotrisiloxane and octamethylcyclotetrasiloxane.

It is preferred that the organosilicon compounds be employed in an amount of from 10 g to 400 g per $m^2$ of area which is to be rendered hydrophobic.

In order to improve the water repellency of the heat insulating articles, it is possible to employ in the process of this invention catalysts which accelerate the reaction of the organosilicon compounds with the Si-bonded hydroxyl groups on the silicon dioxide. Examples of such catalysts are amines, for example cyclohexylamine and n-primary-butylamine, as well as $FeCl_3$, dibutyltin dilaurate, $SnCl_4$, dibutyltin dichloride, $BCl_3$, HCl, HBr and phosphoronitrile chlorides.

When such catalysts are used, they are preferably used in amounts of from 0.02 to 2.0 percent by weight, based on the weight of the organosilicon compound employed.

The organosilicon compound and catalyst when employed, may be applied to the surface of the heat insulating articles, for example by spraying, with the aid of rollers, immersion or coating, or by exposing the heat insulating articles to vapors of the organosilicon compounds.

It is preferred that after the application of the organosilicon compound and catalyst, when employed, the heat insulating articles be heated from 100° to 350° C. for from 5 to 60 minutes in order to achieve good hydrophobicity and to remove the excess organosilicon compound, as well as any by-products such as ethanol or water which might have been generated in the treatment.

The improved heat insulating articles may for example be employed to insulate heat storage facilities. They may also be employed in stove heating elements and as components of heaters and for embedding heating coils.

Heretofore, it was necessary to store and ship the untreated heat insulating articles under dry conditions; however, no special precautions need be taken with the heat insulating articles which are treated in accordance with the process of this invention. In fact, these insulating articles may be exposed to the weather and still provide insulation from high temperatures as well as from low temperatures.

The heat insulating articles used in the following examples are plates which are prepared by shaping under pressure, a mixture containing 1,500 g of silicon dioxide having a surface area of 400 $m^2/g$ ("HDK T 40", available from Wacker-Chemie GmbH, Munich, German Federal Republic), 876 g of Ilmenite as opacifier and 141 g of inorganic fiber in a fiberglass fleece under a pressure of 10 $kp/cm^2$, with said plates measuring 90 mm × 90 mm × 10 mm.

EXAMPLE 1

The heat insulating plates are immersed for from 10 to 20 seconds in hexamethyldisiloxane heated to 60° C. and thereafter the treated plates are heated at 200° C. for 30 minutes in a drying chamber.

EXAMPLE 2

The heat insulating plates are immersed for from 10 to 20 seconds in a mixture heated to 60° C. containing 60 percent by weight of hexamethylcyclotrisiloxane and 40 percent by weight of octamethylcyclotetrasiloxane and thereafter the treated plates are heated in a drying chamber at 300° C. for 30 minutes.

EXAMPLE 3

The heat insulating plates are immersed for from 10 to 20 seconds in a mixture heated to 60° C. containing 60 percent by weight of hexamethylcyclotrisiloxane, 40 percent by weight of octamethylcyclotetrasiloxane and 4 percent by weight of cyclohexylamine and thereafter the plates are heated for 30 minutes in a drying chamber at 150° C.

EXAMPLE 4

The procedure described in Example 3 is repeated, except that the temperature in the drying chamber is maintained at 200° C.

EXAMPLE 5

The heat insulating plates which have been preheated in a drying chamber to 70° C. are sprayed for from 1 to 2 minutes with hexamethyldisiloxane and then heated for 30 minutes at 200° C.

EXAMPLE 6

The heat insulating plates which have been preheated in a drying chamber to 70° C. are sprayed for from 1 to 2 minutes with the cyclic dimethylpolysiloxane mixture described in Example 2 which was heated to 60° C. The plates are then heated in a drying chamber for 30 minutes at 300° C.

EXAMPLE 7

The heat insulating plates which have been preheated in a drying chamber to 70° C. are sprayed for from 1 to 2 minutes with the mixture of cyclic dimethylpolysiloxanes and cyclohexylamine described in Example 3. The plates are then heated in the drying chamber for 30 minutes at 150° C.

EXAMPLE 8

The process described in Example 7 is repeated, except that the temperature in the drying chamber is maintained at 200° C.

EXAMPLE 9

In a container which has been preheated to 200° C., heat insulating plates are exposed for 10 minutes to gaseous hexamethyldisilazane and thereafter the plates are heated in a drying chamber for 2 hours at 200° C.

EXAMPLE 10

In a container which has been preheated to 200° C., heat insulating plates are exposed for 10 minutes to the vapor of the mixture of cyclic dimethylpolysiloxanes described in Example 2 and hereafter the plates are heated in a drying chamber for 2 hours at 300° C.

EXAMPLE 11

In a container which has been preheated to 200° C., heat insulating plates are exposed for 10 minutes to the vapor of the mixture of cyclic dimethylpolysiloxanes and cyclohexylamine described in Example 3. The plates are then heated in a drying chamber for 2 hours at 150° C.

EXAMPLE 12

The process described in Example 11 is repeated, except that the temperature in the drying is maintained at 200° C.

COMPARISON EXAMPLE

Untreated heat insulating plates are heated for 30 minutes in a drying chamber.

The following Table shows the properties of the heat insulating plates which were treated in accordance with Examples 1 through 12 and the Comparison Example.

ane, octamethylcyclotetrasiloxane and silicon compounds of the formulas $$(R_3Si)_a Z \text{ and } R_a SiZ'_{4-a'}$$

in which R is selected from the group consisting of monovalent hydrocarbon radicals and halogenated monovalent hydrocarbon radicals, Z is selected from the group consisting of hydrogen, halogen, OH, —OR', —NR'X, —ONR'$_2$, —SR', —OOCR', —O—, —NX and —S—, Z' is selected from the group consisting of hydrogen, halogen, —OH, —OR', —NR'X, —ONR'$_2$, —SR' and —OOCR', R' is a radical having from 1 to 4 carbon atoms, X is selected from the groups consisting of hydrogen and R' and a is 1 or 2, and thereafter removing the excess organosilicon compound employed in the treatment of the elements.

2. The process of claim 1, wherein the insulating elements contain organic fibers.

3. The process of claims 1 or 2, wherein the organosilicon compound is a mixture of at least two compounds selected from the group consisting of hexamethylcyclo-

TABLE

| Example | Weight increase following application of organosilicon compound prior to heating in drying chamber g | Weight after heating in drying chamber less original weight g | Weight after 48 hours storage at 97% relative humidity, less weight after heating in drying chamber g | Weight after 48 hours storage under water, less weight after heating in drying chamber g |
|---|---|---|---|---|
| 1 | 6.5 | 0.3 | 0.94 | 8.1 |
| 2 | 4 | 0.33 | 1.27 | 6.38 |
| 3 | 4 | 0.95 | 1.91 | 4.65 |
| 4 | 4 | 0.85 | 0.95 | 3.85 |
| 5 | 5.79 | (+) | 0.66 | 2.91 |
| 6 | 5.12 | (+) | 1.53 | 39.43(++) |
| 7 | 3.04 | (+) | 1.12 | 23.32(++) |
| 8 | 2.28 | (+) | 1.42 | 15.48(++) |
| 9 | (+) | (+) | 0.35 | 1.7 |
| 10 | (+) | (+) | 1.19 | 57.66 |
| 11 | (+) | (+) | 0.44 | 2.02 |
| 12 | (+) | (+) | 0.40 | 1.6 |
| Comparison Example | — | −0.3 | 3.05 | 61.38 |

(+) = not determined
(++) = unsatisfactory results because the hexamethylcyclotrisiloxane crystallized in the spray nozzle resulting in an uneven application.

What is claimed is:

1. A process for improving heat insulating elements which are prepared via a dry process from silicon dioxide having a surface area of at least 50 m$^2$/g and opacifiers which comprises treating the surface of the heat insulating elements with at least 1 organosilicon compound containing from 1 to 4 silicon atoms selected from the group consisting of hexamethylcyclotrisiloxtrisiloxane, octamethylcyclotetrasiloxane and hexamethyldisilazane.

4. The process of claims 1 or 2, wherein a catalyst is used which accelerates the reaction of the organosilicon compound with the Si-bonded hydroxyl groups on the silicon dioxide.

5. The heat insulating elements prepared in accordance with the process of claims 1 or 2.

* * * * *